Aug. 25, 1970     B. H. MOORE     3,525,996

CORE FOR A PUSH-PULL CABLE

Filed July 5, 1968     3 Sheets-Sheet 1

INVENTOR.
BRUCE H. MOORE
BY Hamilton, Cook,
Renner & Kenner
ATTORNEYS

Aug. 25, 1970  B. H. MOORE  3,525,996
CORE FOR A PUSH-PULL CABLE

Filed July 5, 1968  3 Sheets-Sheet 2

INVENTOR.
BRUCE H. MOORE
BY Hamilton, Cook
Renner & Kenner
ATTORNEYS

United States Patent Office 3,525,996
Patented Aug. 25, 1970

3,525,996
CORE FOR A PUSH-PULL CABLE
Bruce H. Moore, Hudson, Ohio, assignor, by mesne assignments, to North American Rockwell Corporation, Pittsburgh, Pa., a corporation of Delaware
Filed July 5, 1968, Ser. No. 742,787
Int. Cl. F16c *1/10*
U.S. Cl. 74—501                                           7 Claims

ABSTRACT OF THE DISCLOSURE

A core for a push-pull cable. The core has a flexible inner member and an outer wrap formed from one or more metallic ribbons wound helically about the inner member. Each ribbon of the outer wrap has a D-shaped cross section—i.e., at least a portion of the outer wall thereof is curvilinear.

BACKGROUND OF THE INVENTION

The present invention relates generally to push-pull cables and specifically to an improved construction for the core of a push-pull cable. Push-pull cables generally comprise a flexible casing adapted to receive a flexible core slidable therein for transmitting mechanical motion in either direction when the ends of the casing are suitably clamped in position.

Although the prior art knows many constructions for push-pull control cable casings, one of the most suitable constructions for the assurance of flexibility and efficiency comprises a plurality of casing wires laid contiguously in a long pitched helix around the outer periphery of a plastic tube. The helically arranged wires of the casing are maintained in their proper position solely by a plastic cover in the smaller sizes and by a reinforcing spread helix of wire or flat metallic ribbon, in conjunction with the plastic cover, in larger sized cables.

The plastic tube that comprises the innermost element of the cable casing acts as a bearing for the core of the cable which is slidable within the casing and also to protect the casing wires from the elements having access to the interior of the casing, along the core. The plastic cover, which comprises the outermost element of the casing, not only acts as a structural member to retain the casing wires in the coil they form about the inner tube but also act as a protective member to shelter the wires from the exterior elements.

Such casings, being flexible, are particularly suitable for installation where the cable is required to extend through a number of bends between a control station and a remote, controlled station. The cores, likewise, must be flexible and yet have not only high tensile strength to transmit tensile loads but also a high degree of columnar strength in order to transmit heavy compressive loads.

Coupled with flexibility, the core, in particular, must possess a sufficient tendency to return to its straight line orientation so that it will not assume permanent bends or retain slight bends that would maintain undesirable contact points with the interior of the casing and thereby interfere with the smooth reciprocation of the core within the casing and yet it must not be readily subject to fatigue.

Heretofore, the best known core construction utilized a stranded inner element surrounded and contained by an outer wrap. These inner elements are advantageously formed of a plurality of wires helically laid together in a manner well known to the art. The inner elements are generally designated by the number of wires, or filaments, in each strand and the number of strands laid together to form the inner member. By this system a typical inner member would be designated as a 7 x 7 construction. A 7 x 7 inner member comprises seven strands each comprising seven wires. Similarly, a 1 x 19 construction would comprise 19 strands, each having only one wire.

Accoring to the typical prior known push-pull cable core construction, a metallic outer wrap is helically laid over the inner element, the outer wrap being preferably wound in an opposite direction, or hand, with respect to the helical direction in which strands of the inner element are laid. Although the outer wrap on most prior art cores comprises one or more flat ribbons of wire having squared off edges, at least one prior known core construction utilizes a wrap wherein the adjacent edges of successive turns are shaped such that they at least partially overlap.

In either event, after the outer wrap is applied the core is swaged so that the outer wrap is compressed onto the inner element. As a result of this swaging the metal of the outer wrap is forced into the crevices between strands of the inner element, and, if the strands are themselves of multiple wires, into the crevices between the several wires forming the strands. In this manner the outer wrap and the inner element are interlocked so that substantial relative axial movement therebetween is precluded.

It has been found that this interlocking of the outer wrap onto the inner element will seriously impair of flexibility of the core, and several concepts have been employed to reimpart flexibility to the core. According to one concept the outer wrap is minutely stretched by partially crushing and reforming the assembled core. Another concept employs a second swaging in a direction reverse to that employed when the outer wrap is interlocked to the inner member. A third concept utilizes multiple ribbons to form the outer wrap, these ribbons being wrapped at a helical angle, or lead, such that the same ribbon does not completely encircle any cross-section of the inner member. And, a fourth concept utilizes an outer wrap of at least two ribbons having different, but intermeshing, cross-sections to control the spacing between successive turns of the same ribbon upon the inner member and to permit lateral shifting of the two wraps with respect to each other so as to accommodate flexure of the core.

Irrespective of the concept employed to assure the requisite flexibility, none of the prior art constructions have permitted repeated flexure of the core about a small radius, as when winding directly onto a small diameter control drum or when the cable itself must be bent about a small radius, without exhibiting premature fatigue failure.

Core fatigue is initially evidenced by failure of the outer wrap. When the core is repeatedly flexed the ribbons of the outer wrap heretofore employed are subjected to excessive torsional stresses that themselves will fatigue the wrap. Failure is further accelerated by stress concentration in the outer wrap, the propensity for which is inherent from the fabrication of the prior known constructions.

Failure of prior known core constructions has also resulted from wear, particularly under compressive loads, to that portion of the outer wrap that extends beyond the cable casing into the extension tube of the terminal structure. Conversely, wear to the casing, occasioned by the scrubbing of the core against the interior thereof, has been pronounced with prior known core constructions.

The contact of the core against the interior of the extension tube which results in wear to the outer wrap of the core also comprises a frictional braking action against movement of the core that reduces the overall operating efficiency of the push-pull cable.

SUMMARY OF THE INVENTION

It is, therefore, a primary object of the present invention to provide a core for a push-pull cable that possesses the desired flexibility and yet is not as subject to fatigue failure as prior known core constructions.

It is another object of the present invention to provide a push-pull cable core, as above, having an outer wrap comprised of one or more ribbons that are not as subject to excessive torsional stresses upon flexure of the core as prior known wraps and which will not assume the propensity for pernicious stress concentrations inherent to prior constructions upon fabication of the core.

It is a further object of the present invention to provide a push-pull cable core, as above, that will not deleteriously scrub the interior of the cable casing.

It is a still further object of the present invention to provide a push-pull cable core, as above, that permits joinder to the terminal arrangement such that the core will not as readily wear or induce a frictional braking action within the terminal extension tube as do prior known cores.

These and other objects, as well as the advantages thereof over existing and prior art forms, will become apparent in view of the following detailed description of the attached drawings and are accomplished by means hereinafter described and claimed.

In general, a push-pull cable core embodying the concept of the present invention has a flexible inner member embraced by an outer wrap. The outer wrap comprises one or more ribbons wound helically about the inner member, each ribbon having a cross section such that at least the lateral portions of the outer surface thereof are curvilinear. The base surface of each ribbon, which may be either planar or also curvilinear, engages the inner member.

The inner member, as is customary, may be comprised of a plurality of strands laid helically together. The metal from the medial portion of the base of each ribbon in the outer wrap extends into the crevices between adjacent strands of the inner member to interlock the ribbon, or ribbons, thereto.

An end rod may be secured to a core constructed in accordance with the present invention such that the outer diameter of the end rod will be substantially equal to the outer diameter of the core.

One preferred embodiment and several alternative arrangements thereof are shown by way of example in the accompanying drawings without attempting to show all of the various forms and modifications in which the invention might be embodied; the invention being measured by the appended claims and not by the details of the specification.

DESCRIPTION OF A PREFERRED EMBODIMENT

Figure 1:
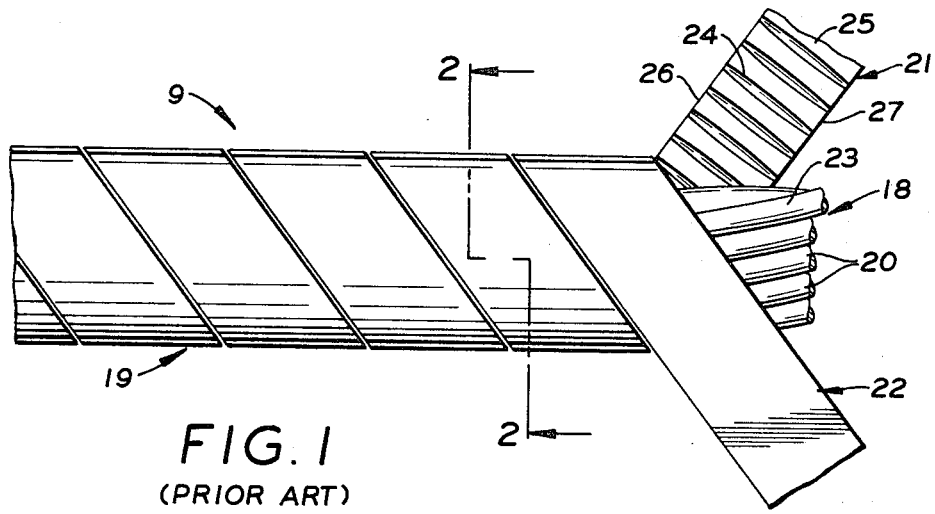
FIG. 1 is a side elevation of a typical prior art core for a push-pull cable with a portion of the outer wrap unwound to reveal the inner member and the grooves in the ribbons of the outer wrap.
Figure 2:
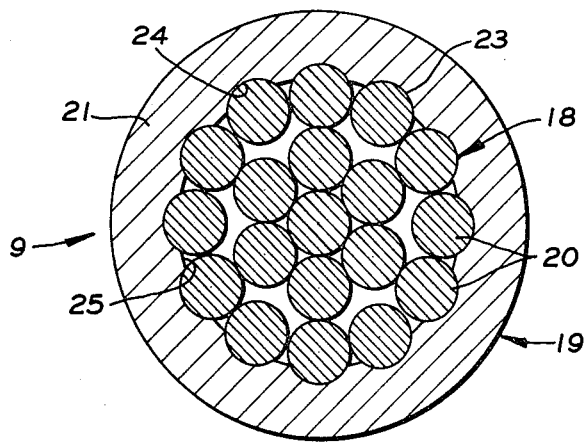
FIG. 2 is an enlarged cross section of a typical prior art core, taken substantially on line 2—2 of FIG. 1.
Figure 3:
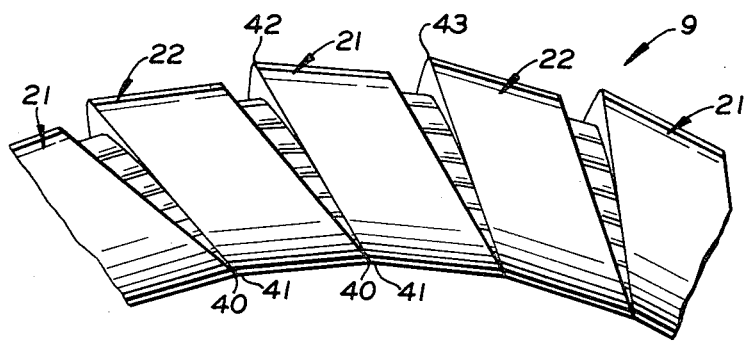
FIG. 3 is a side elevation of a typical prior art core, as represented by FIG. 1, depicted in an arcuately flexed position.

Referring more particularly to the drawings, a typical prior art cable core is depicted in FIGS. 1–3 and indicated generally by the numeral 9. FIGS. 4–12, on the contrary, depict a cable core embodying the concept of the present invention, identified generally by the numeral 10.

The core 10, or even the prior art core 9, may be reciprocatingly received within a conventional casing 12 (FIG. 4) to transmit mechanical motion by the application of either tensile or compressive forces to the core when the ends of the casing are clamped in substantially fixed positions. In the exemplary casing construction depicted in FIG. 4, the casing 12 is formed by a plurality of casing wires 13 laid contiguously, in the form of a long pitched, helical coil, about the radially outer surface of an inner, plastic tube 14 that extends the full length of the casing 12. An outer cover 15 encases the coil of wires 13 up to within a short distance from the ends thereof.

A fitting 16 is positioned over the end of the cable casing 12 and is cold swaged, or otherwise suitably connected, onto the exposed portion of the cylindrical grouping of wires 13. A plurality of annular ribs, not shown, may be provided within the fitting 16 which, when crimped onto the cover 15, effect a seal between the end fitting 16 and the cover 15.

Referring now to FIGS. 1 and 2 the core 9 has a 1 x 19 inner member 18. That is, the inner member 18 is comprised of nineteen individual strands 20 laid helically together in the form of a wire rope, as is well known to the art. In a 1 x 9 inner member each strand 20 is itself a single wire, or filament.

The outer wrap 19 of core 9 is comprised of two, flat, steel ribbons 21 and 22 that are spirally wound about the inner member 18. With the ribbons 21 and 22 so wound about the inner member 18 the thus assembled core 9 is subjected to a swaging operation that forces the metal on the ribbons 21 and 22 into the crevices between the strands 20 forming the inner member 18. As the metal flows into these crevices the surface 23 of each strand 20 in contact with the ribbons 21 and 22 chases a groove 24 into the radially inner surface 25 of each ribbon in the outer warp 19. As best seen in FIG. 1, wherein the ends of ribbons 21 and 22 are depicted as having been unwound from the inner member 18 after swaging, inasmuch as the helical lay of the strands 20 is of opposite hand to the helical lay of the ribbons 21 and 22, the grooves 24 extend generally transversely of each ribbon and fully between the lateral edges 26 and 27 thereof.

As pointed out above, in order to restore the flexibility of the core further processing is required minutely to stretch the ribbons 21 and 22. This restoration of flexibility does not, however, alter the grooves 24, and it is these grooves 24 which contribute to the pernicious stress concentrations that ultimately lead to failure of the outer warp and thus the core itself.

Particularly under the application of heavy compressive loads to the core it is the function of the outer wrap to maintain the integrity, and therefore the columnar strength, of the inner memeber. It is well known that the inner member tends to expand radially—i.e., to "bird cage"—under such loads, and this tendency must be precluded by the outer wrap for the core to transmit compressive loads. In resisting "bird caging" of the inner members the ribbons of the outer wrap are subjected to tensile stresses. Were it not for grooves 24 one might consider that these tensile stresses in each ribbon 21 and 22 are substantially uniform across any section of the ribbon. However, because of these grooves 24, the tensile stress is not uniformly distributed over the cross section of each ribbon but reaches a maximum value at the grooves 24.

The ratio of the maximum stress at each groove to the average stress is effected by the ratio of the radius of that groove 24 to the thickness of the ribbon. When this ratio is small the stress concentration is greatest. For example, with a groove of infinitely small radius in a ribbon of infinite thickness the maximum stress is approximately three times the average stress.

In the environment of a push-pull cable core stress concentrations are quite serious. Under repeated loads, and particularly where the loading is concurrent with flexure of the core about a relatively small radius, localized stresses above the endurance limit, even though they may exist only for a very small area during a very short time, tend to induce fatigue cracks. These are pronounced at the edges of the ribbon where the grooves 24 terminate and where the torsional stresses induced by bending of the core about a small radius are also the greatest.

Once the ribbons 21 and 22 crack, the effective cross section of the ribbons is reduced, increasing the average stress, and further stress concentrations adjacent the crack will eventually result in complete failure of the ribbons along one or more grooves 24. Without the constraining effect of the outer wrap 19 a compression load applied to the core will cause the strands 20 of the inner member 18 to expand, or "bird cage," radially outwardly and bind the broken ribbons against the interior of the casing.

In order to preclude this inherent tendency of the prior art push-pull cables to fail as a result of tensile stress concentrations, the propensity for which is introduced as a result of the manufacturing technique, combined with torsional stresses at the edges of the ribbons comprising the outer wrap, the concept of the present invention may be employed.

Figure 4:
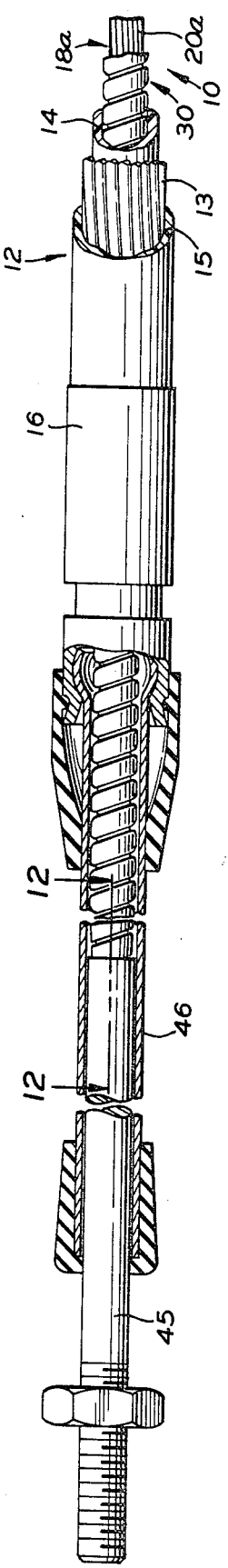
FIG. 4 is a side elevation, partly broken away and partly in section, of a push-pull cable utilizing a core embodying the concept of the present invention and disclosed in conjunction with a typical terminal arrangement.
Figure 6:
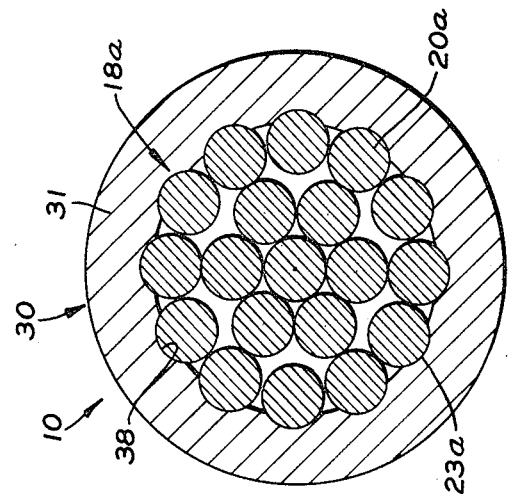
FIG. 6 is a further enlarged cross section of the improved core taken substantially on line 6—6 of FIG. 5.
Figure 5:
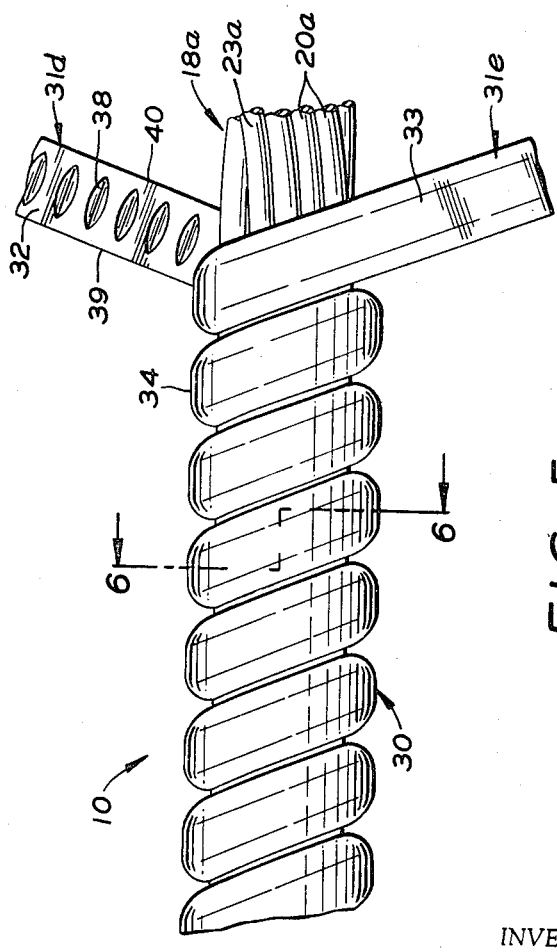
FIG. 5 is an enlarged area of FIG. 4 depicting a portion of the improved core in side elevation with a portion of the outer wrap unwound to reveal the inner member and the grooves on the base of the ribbons from which the outer wrap is wound.

As shown in FIGS. 4–6, the improved core 10 may utilize a conventional inner member 18a having strands 20a.

The outer wrap 30 may be comprised of one or more ribbons 31 having a base 32 and a curvilinear outer wall 33. Although the outer wall 33 may originally have a constant rate of curvature and be, therefore, semicircular as represented by wall 33a on ribbon 31a in FIG. 9, the outer wall 33 may, as well, originally have a varied rate of curvature and be generally semielliptic, as represented by wall 33b on ribbon 31b in FIG. 10 or have a planar face 34 spaced outwardly of the base 32 and joined thereto by curvilinear lateral portions 35 and 36 as represented by wall 33c on ribbon 31c in FIG. 11. In any event, at least the lateral portions 35 and 36 of the outer wall 33 are generally curvilinear such that the cross section of the ribbon, or ribbons, 31 of the outer wrap 30 on the improved core 10 is susbtantially "D-shaped." In this regard it must be appreciated that even if the base should be initially planar, as is shown by the chain line representation 32a in FIG. 11, when the ribbon 31 is wound helically about the inner member 18a, the base tends to become convex, as shown by the solid line representation 32 in FIG. 11. Of course, one could, as well, form the ribbon 31 so that the base is initially convex. Irrespective of whether the base is initially planar and beceomes convex or whether the base is initially convex, the cross section of the ribbon is substantially "D-shaped."

Figure 8:
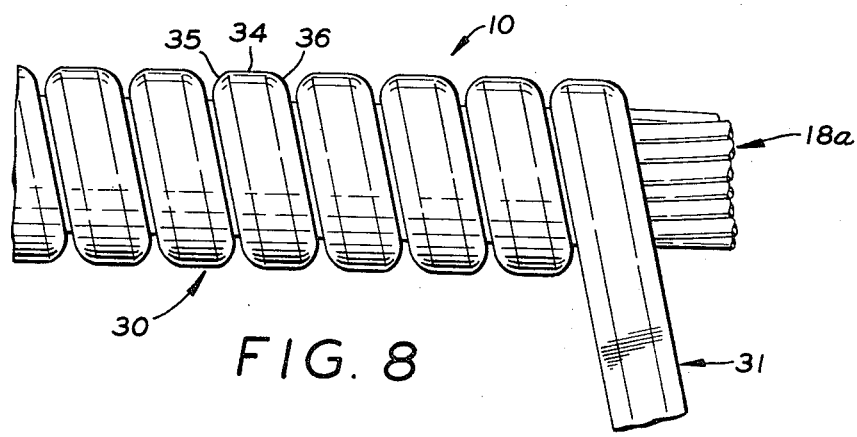
FIG. 8 is a view similar to FIG. 5 except that the outer wrap of the improved core depicted utilizes only one ribbon rather than the two ribbons depicted in FIG. 5.
Figure 9:
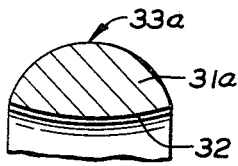
FIG. 9 is a cross section of a typical ribbon that may be incorporated in the outer wrap of the improved core.
Figure 11:
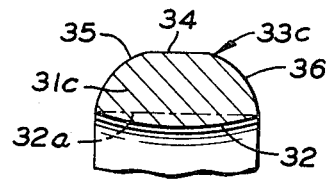
FIG. 11 is a view similar to FIGS. 9 and 10 depicting a further alternative form of ribbon in cross section; and, FIG. 12 is an enlarged cross section taken substantially on line 12—12 of FIG. 4 depicting the joinder of the improved core to an end rod.
Figure 10:
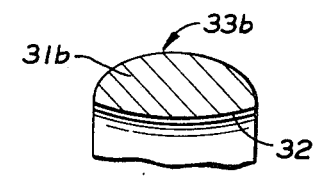
FIG. 10 is a view similar to FIG. 9 depicting an alternative form of ribbon in cross section.

As shown in FIG. 8, a single ribbon 31 may be wound helically about the inner member 18a, or, as shown in FIG. 5, two ribbons 31d and 31e may be wound helically about the inner member 18a. Irrespective of the number of ribbons employed, with the ribbon, or ribbons, 31 so wound about the inner member 18a the thus assembled core elements are subjected to rotary swaging in the direction the ribbons are wrapped to provide an intimate bond between the outer wrap 30 and the inner member 18a. Here too the metal of the outer wrap 30 is forced, by the swaging operation, to flow into the crevices between the strands 20a of the inner member 18a.

However, because of the unique cross section of the ribbon, or ribbons, 31 used in the outer wrap 30, the surface 23a of each strand 20a in contact with the ribbon 31 chases a groove 38 into only the medial portion of the base 32. That is, the grooves 38, though oriented generally transversely of the ribbon 31 (the helical lay of the strands 20a in inner member 18a being preferably of opposite hand to the helical lay of the ribbon 31) do not extend fully between the lateral edges 39 and 40 of the ribbon 31, as depicted in FIG. 5.

As the swaging die engages the outer wrap 30 it will contact only the radially outermost portion of the outer wall 33. Thus, even though the swaging die may impress a planar face 34, irrespective of the outer wall 33 originally presented, the die will not affect the edges 39 and 40 of the ribbon 31 so that only the medial portion of the base 32 on each ribbon is forced into intimate contact with the strands 20a of the inner member 18a. Nor will reverse swaging, as is sometimes necessary to assure sufficient flexibility to the core, increase the extent of the groove 38. It is for this reason that the grooves 38 are of limited extent and do not intercept the edges 39 and 40.

Accordingly, even though there will be tensile stress concentrations adjacent the groove 38, these concentrated stresses do not occur at the edges of the ribbon 31, where, in combination with torsional stresses, they are more likely to induce fatigue cracking. Moreover, the maximum torsional stresses are themselves reduced. Specifically, the generally "D-shaped" cross section of the ribbons 31 forming the outer wrap 30 permits an equivalent, or larger, cross section than the flat ribbon wrap 19 on core 9 with less span between the edges 39 and 40. This reduction in the width of the ribbon engenders a concomitant reduction in the maximum torsional stresses imposed on the edges of each ribbon comprising the outer wrap during extreme flexure of the core 10 as compared to the prior art core 9. With edge stresses reduced so is the likelihood of fatigue cracking.

Although the resulting reduction in fatigue failure is of extreme importance, the improved core also provides additional nonobvious advantages.

Figure 7:
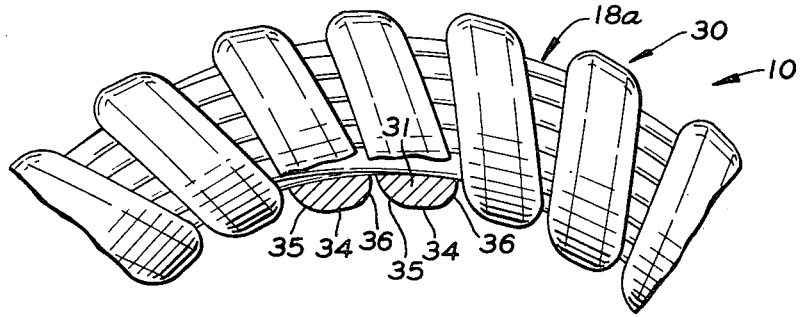
FIG. 7 is a side elevation of the improved core depicted in arcuately flexed position.

In order to assure flexibility of the core the successive windings of the ribbons forming the outer wrap must be somewhat axially spaced, and yet not so far spaced as to permit even minimal "bird caging" between successive windings thereof. So spaced, when the core 9 is flexed to an arc of even modest radius, as depicted in FIG. 3, the adjacent corners 40 and 41 of the ribbons 21 and 22 on the radially inner side of the arc will abut. However, when the ribbons have the novel cross section herein disclosed, the core 10 may be flexed to an arc of minimal radius, as shown in FIG. 7, without abutment between the successive windings of the ribbons 31 on the radially inner side of the arc.

Moreover, when the core 9 is flexed, as shown in FIG. 3, the corners 42 and 43 of ribbons 21 and 22 on the radially outer side of the arc act like saw teeth as they scrub the interior of the casing in which the core is received. To the contrary, because at least the lateral portions of the outer surface 33 of the ribbons 31 are curvilinear, even when the core 10 is extensively flexed, as shown in FIG. 7, the outer wrap 30 will not tend to abrade, or brakingly contact the innermost surface of the casing in which the core 10 slides.

The shape of the outer surface 33 of the ribbons comprising the outer wrap of core 10 also effectively reduces the bearing contact between the casing and core while providing reservoir spacing between successive wraps for the storage of lubricant should lubrication of the core to casing contact be desired.

Figure 12:
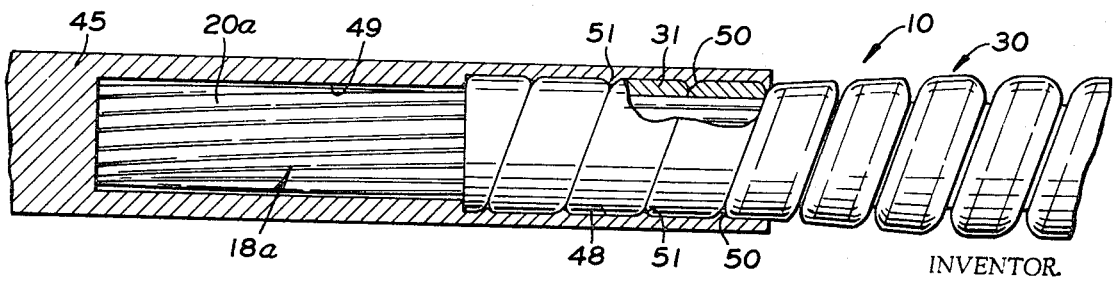

Generally and particularly with heavy loading the core 10 connects to an end rod 45 for transmitting mechanical motion exteriorly of the casing. A typical arrangement is depicted in FIGS. 4 and 12 wherein an extension tube 46 is swivelly mounted on the end fitting 16, and the end rod 45 is slidably received within the extension tube 46. Ideally, the extension tube 46 is closely fitted around both the end rod 45 and the core, when the latter extends into the tube 46. However, with prior known core constructions a dimensional differential exists between the end rod 45 and the core such that excessive deflection of the core can readily occur within the extension tube 46. In fact, with prior known constructions as the core is moved into the extension tube the core itself tends to spiral against the inner wall of the tube 46 in the same direction that the outer wrap is wound. This is not only deleterious to the core but also imparts considerable braking friction to the core and thereby seriously reduces the efficiency of the control cable installation.

The improved construction of core 10, to the contrary, permits it to be connected to an end rod with relatively little dimensional differential therebetween.

As shown in FIG. 12, the end rod 45 is provided with a first bore 48 extending axially into the rod 45 from one end thereof and a second bore 49 of smaller diameter than, and concentric with, said first bore 48 extending axially into said rod 45 from the base of said first bore 48. With a sufficient portion of the outer wrap 30 removed from the end of the inner member 18a to expose a length equal to the axial extent of the second bore 49, the exposed inner member 18a is receivable within bore 49 and an adjacent length of the core, replete with outer wrap 30, is adapted to be received within bore 48. Facile entry of the outer wrap into bore 48 is provided by first size swaging at least that portion of the core to be received within bore 48. With the end portion of the outer wrap thus initially swaged the core is inserted into the concentric bores 48 and 49 in end rod 45 and the latter may then also be swaged onto the portions of the core 10 received within bores 48 and 49.

The primary structural joinder between the core 10 and the end rod 45 is accomplished by the adherence of rod 45 to that portion of the inner member 18a within the bore 49. Because of the D-shaped cross section of the ribbons 31 comprising the outer wrap 30, when the portion of the core 10 to be received in bore 48 is initially size swaged the metal of ribbons 31 will flow radially inwardly and axially into the spaces between successive wraps of ribbon, as shown in FIG. 12. Hence, with the improved core 10 when the portion of rod 45 radially outwardly of the first bore 48 is swaged onto the core 10 there need be only a minimal, if any, dimensional variation between the diameter of the core 10 and the largest diameter of the end rod 45. With this conformity between the outer diameter of the core 10 and the outer diameter of the end rod 45 obtained by use of the improved core construction, the core 10 and rod 45 can both be closely embraced to slide within the extension tube 46. Accordingly, the core 10 can not spiral within the tube 46 so that wear to the core and the attending frictional braking are thereby precluded.

It should also be noted that the swaging of the rod 45 onto the core causes the metal in the rod to flow into the small crevices 50 between successive wraps of ribbon 31 and form spiral lock lugs 51 that further augment the tenacity with which the rod 45 grips the improved core 10.

It should now be apparent that a core constructed in accordance with the concept of the present invention eliminates stress concentrations along the edges of the ribbon, or ribbons, comprising the outer wrap without detracting from the desired flexibility and otherwise accomplishes the objects of the invention.

I claim:

1. A core for a push-pull cable comprising, a flexible inner member and an outer wrap, said outer wrap comprising at least one metallic ribbon helically wound about said inner member, said ribbon having a substantially D-shaped cross section defined by a base and an outer wall, at least the lateral portions of said outer wall being curvilinear, the metal from the medial portion of said base being interlocked with said inner member.

2. A core for a push-pull cable, as set forth in claim 1, in which the inner member has crevices and the base is convex, only the metal from the medial portion of said base being displaced to occupy a portion of said crevices and thereby interlock the outer wrap with said inner member.

3. A core for a push-pull cable, as set forth in claim 1, in which said inner member comprises a plurality of helically oriented strands in which the outer wrap comprises at least one ribbon oriented helically about said inner member in a direction opposite the helical orientation of said strands.

4. A push-pull cable having a flexible casing, a core slidably received within said casing, said core having a flexible inner member and a flexible outer wrap, said outer wrap having at least one ribbon helically engaging said inner member, said ribbon having a base embracing said inner member, only the medial portion of said base being interlocked with said inner member.

5. A push-pull cable, as set forth in claim 4, in which said ribbon has an outer wall facing radially outwardly of said core, at least the lateral portions of said outer wall being curvilinear.

6. A push-pull cable, as set forth in claim 5, in which said core is connected to an end rod, said end rod having an axial first bore and an axial second bore concentric with and extending from said first bore, an end portion of the inner member of said core received within said second bore and said combined inner member and outer wrap received within said first bore, the outer diameter of said end rod being substantially the same as the outer diameter of said core.

7. A push-pull cable, as set forth in claim 6, in which the inner member of said core comprises a plurality of helically oriented strands and in which the ribbon of said outer wrap is oriented helically about said inner wrap in a direction opposite the helical orientation of said strand.

References Cited

UNITED STATES PATENTS

| 2,189,452 | 2/1940 | Stone | 74—501 |
| 1,140,425 | 5/1915 | Wessoleck | 74—501 |
| 1,970,702 | 8/1934 | Kuney | 74—501 |
| 2,691,900 | 10/1954 | Brickman | 74—501 |
| 2,706,417 | 4/1955 | Waner | 74—501 |
| 3,240,082 | 3/1966 | Bratz | 74—501 |

WESLEY S. RATLIFF, JR., Primary Examiner

PO-1050
(5/69)

UNITED STATES PATENT OFFICE
CERTIFICATE OF CORRECTION

Patent No. 3,525,996   Dated August 25, 1970

Inventor(s) BRUCE H. MOORE

It is certified that error appears in the above-identified patent and that said Letters Patent are hereby corrected as shown below:

Column 4, line 49, change "9" to -- 19 --.

Column 5, line 4, change "memeber" to -- member --.

Column 5, line 22, change "infinite" to -- finite --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents